United States Patent
Shen

(10) Patent No.: US 12,276,113 B1
(45) Date of Patent: Apr. 15, 2025

(54) DIVERSE DECORATION PANEL SYSTEM

(71) Applicant: Long Xiang Shen, San Bernardino, CA (US)

(72) Inventor: Long Xiang Shen, San Bernardino, CA (US)

( * ) Notice: Subject to any disclaimer, the term of this patent is extended or adjusted under 35 U.S.C. 154(b) by 0 days.

(21) Appl. No.: 18/626,169

(22) Filed: Apr. 3, 2024

(51) Int. Cl.
*E04F 13/08* (2006.01)
*A01G 9/02* (2018.01)

(52) U.S. Cl.
CPC ............ *E04F 13/0817* (2013.01); *A01G 9/02* (2013.01)

(58) Field of Classification Search
CPC .. E04F 13/0817; E04F 13/0801; E04B 1/043; E04B 1/215; E04B 2/7425; E04B 2001/389
USPC ............... 52/127.1, 275, 282.3, 282.4, 285.1
See application file for complete search history.

(56) References Cited

U.S. PATENT DOCUMENTS

| | | | | |
|---|---|---|---|---|
| 4,030,262 A | * | 6/1977 | Dean ...................... | E04C 2/044 52/587.1 |
| 4,435,935 A | * | 3/1984 | Larrea ................. | E04F 13/0889 52/471 |
| 4,843,788 A | * | 7/1989 | Gavin ...................... | E04H 3/08 52/750 |
| 6,571,524 B2 | * | 6/2003 | Pantelides ............... | E04B 1/383 156/92 |
| 7,985,444 B2 | | 7/2011 | Quist et al. | |

FOREIGN PATENT DOCUMENTS

CN 112095811 A * 12/2020

\* cited by examiner

*Primary Examiner* — Patrick J Maestri
(74) *Attorney, Agent, or Firm* — Ying-Ting Chen; Law Office of Michael Chen

(57) ABSTRACT

A diverse decoration panel system includes at least one decoration panel; at least one panel connector configured to couple one of the decoration panels with the other one of decoration panels; wherein each of the decoration panels comprises at least one connection through hole configured to engage with the panel connector to securely connect the one of decoration panel with the other one of decoration panels.

15 Claims, 9 Drawing Sheets

DIVERSE DECORATION PANEL SYSTEM

FIELD OF THE DISCLOSURE

The present disclosure relates to a decoration panel, and more particularly, a diverse decoration panel system suitable for not only being arranged as a 2-D decoration panel configuration but also being arranged as a 3-D decoration panel configuration.

BACKGROUND OF THE DISCLOSURE

Generally, artificial green walls have become an increasingly popular option for people who want to add greenery to their indoor or outdoor spaces without the maintenance and upkeep that come with live plants.

The traditional artificial green wall includes a plurality of supporting panels formed as a grid wall and a plurality of artificial leaves coupled on the supporting panels. One of the biggest advantages of using artificial green walls is that they require very little maintenance. Unlike live plants, artificial green walls do not need to be watered, fertilized, or pruned, which can save time and money in the long run. This makes them an ideal choice for busy people who want to enjoy the beauty of plants without the hassle of caring for them.

The second advantage of using artificial green walls is that the artificial green walls are made from high-quality materials designed to withstand the elements, including UV rays, wind, and rain. This means that they will not fade, wilt, or die over time, making them a durable and long-lasting option for the space.

The third advantage of using artificial green walls is that the artificial green walls are highly customizable. A variety of different types of plants, colors, and arrangements can be chosen by the user to create a unique look.

The fourth advantage of using artificial green walls is that using artificial green walls can have health benefits. Research has shown that exposure to nature and greenery can help reduce stress, improve mood, and increase productivity.

However, the current artificial green walls can only be installed as a two-dimensional shape. There may exist a desire to install the artificial green walls as a three-dimensional shape to create the most customized design that reflects the user's personal style and taste.

All referenced patents, applications and literature are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned desires. Although the present embodiments may obviate one or more of the above-mentioned desires, it should be understood that some aspects of the embodiments might not necessarily obviate them.

BRIEF SUMMARY OF THE DISCLOSURE

In a general implementation, the diverse decoration panel system comprises at least one decoration panel; at least one panel connector configured to couple one of the decoration panels with the other one of the decoration panels; wherein each of the decoration panels comprises at least one connection through hole configured to engage with the panel connector to securely connect one of the decoration panels with the other one of the decoration panels.

In another aspect combinable with the general implementation, the decoration panel comprises a first decoration panel and a second decoration panel angledly arranged with the first decoration panel.

Among the many possible implementations of the diverse decoration panel system, wherein the decoration panel comprises a first decoration panel and a second decoration panel parallelly arranged with the first decoration panel.

Further, it is contemplated that the decoration panel comprises a first decoration panel having at least one first connection through hole and a second decoration panel having at least one second connection through hole, wherein the first connection through hole and the second connection through hole are located at the same level.

In the alternative, the panel connector comprises a first connection portion and a second connection portion integrally extended from the first connection portion, wherein the first connection portion is connected with one of the decoration panels and the second connection portion is connected with the other one of the decoration panels.

It is still further contemplated that the panel connector comprises a first connection portion and a second connection portion angledly arranged with the first connection portion, wherein the first connection portion is connected with one of the decoration panels and the second connection portion is connected with the other one of the decoration panels.

In another aspect combinable with the general implementation, the panel connector comprises a first connection portion and a second connection portion parallelly arranged with the first connection portion, wherein the first connection portion is connected with one of the decoration panels and the second connection portion is connected with the other one of the decoration panels.

In another aspect combinable with the general implementation, the panel connector comprises a first connection portion having a first front surface and a first rear surface opposite of the first front surface and a second connection portion having a second front surface and a second rear surface opposite of the second front surface.

In another aspect combinable with the general implementation, the panel connector comprises a first connection portion having a first front surface and a first rear surface, wherein the first connection portion comprises at least one first protrusion integrally extended from the first front surface and configured to engage with at least one first connection through hole formed on the first decoration panel.

In another aspect combinable with the general implementation, the panel connector comprises a second connection portion having a second front surface and a second rear surface, wherein the second connection portion comprises at least one second protrusion integrally extended from the second front surface and configured to engage with at least one second connection through hole formed on the second decoration panel.

In another aspect combinable with the general implementation, the panel connector comprises a first connection portion having at least one first protrusion configured to engage with at least one first connection through hole formed on the first decoration panel and a second connection portion comprises at least one second protrusion configured to engage with at least one second connection through hole formed on the second decoration panel.

In another aspect combinable with the general implementation, the panel connector comprises a first connection portion, a second connection portion, and a third supporting portion integrally extended between the first connection portion and a second connection portion.

In another aspect combinable with the general implementation, the panel connector comprises a first connection portion having a first front surface and a first rear surface, a second connection portion having a second front surface and a second rear surface, and a third supporting portion integrally extended between the first rear surface and the second rear surface to remain the first connection portion being angledly arranged with the second connection portion.

In another aspect combinable with the general implementation, the panel connector comprises a fastener configured to pass through the decoration panel and the panel connector to secure the decoration panel being coupled with the panel connector.

In another aspect combinable with the general implementation, the decoration panel comprises a first decoration panel and a second decoration panel, wherein the panel connector comprises a first fastener passed through the first decoration panel and the panel connector to secure the first decoration panel with the panel connector and a second fastener passed through the second decoration panel and the panel connector to secure the second decoration panel with the panel connector.

In another aspect combinable with the general implementation, the decoration panel comprises a first decoration panel having at least one first connection through hole arranged along a first peripherical edge of the first decoration panel and a second decoration panel having at least one second connection through hole arranged along a second peripherical edge of the second decoration panel.

In another aspect combinable with the general implementation, the decoration panel comprises a first decoration panel having a first peripherical edge and a second decoration panel having a second peripherical edge, wherein the first peripherical edge is aligned to the second peripherical edge.

In another aspect combinable with the general implementation, the decoration panel comprises at least one retaining portion formed along a peripherical edge, wherein the connection through hole is formed on the retaining member.

In another aspect combinable with the general implementation, the decoration panel comprises a first decoration panel, a second decoration panel parallelly arranged with the first decoration panel, and a third decoration panel angledly arranged with the first decoration panel or the second decoration panel.

In another aspect combinable with the general implementation, the decoration panel comprises a first decoration panel, a second decoration panel angledly arranged with the first decoration panel, and a third decoration panel angledly arranged with the first decoration panel and/or the second decoration panel.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above and below as acting in certain combinations and even initially claimed as such, one or more features from a claimed combination can in some cases be excised from the combination, and the claimed combination may be directed to a subcombination or variation of a subcombination.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be too precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENTS

The different aspects of the various embodiments can now be better understood by turning to the following detailed description of the embodiments, which are presented as illustrated examples of the embodiments defined in the claims. It is expressly understood that the embodiments as defined by the claims may be broader than the illustrated embodiments described below.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

It shall be understood that the term "means," as used herein, shall be given its broadest possible interpretation in accordance with 35 U.S.C., Section 112 (f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Unless defined otherwise, all technical and position terms used herein have the same meaning as commonly understood by one of ordinary skill in the art to which the invention pertains. Although many methods and materials similar, modified, or equivalent to those described herein can be used in the practice of the present invention without undue experimentation, the preferred materials and methods are described herein. In describing and claiming the present invention, the following terminology will be used in accordance with the definitions set out below.

A "peripheral edge", as used herein, refers to the external boundary of a decoration panel of the invention.

Figure 1:
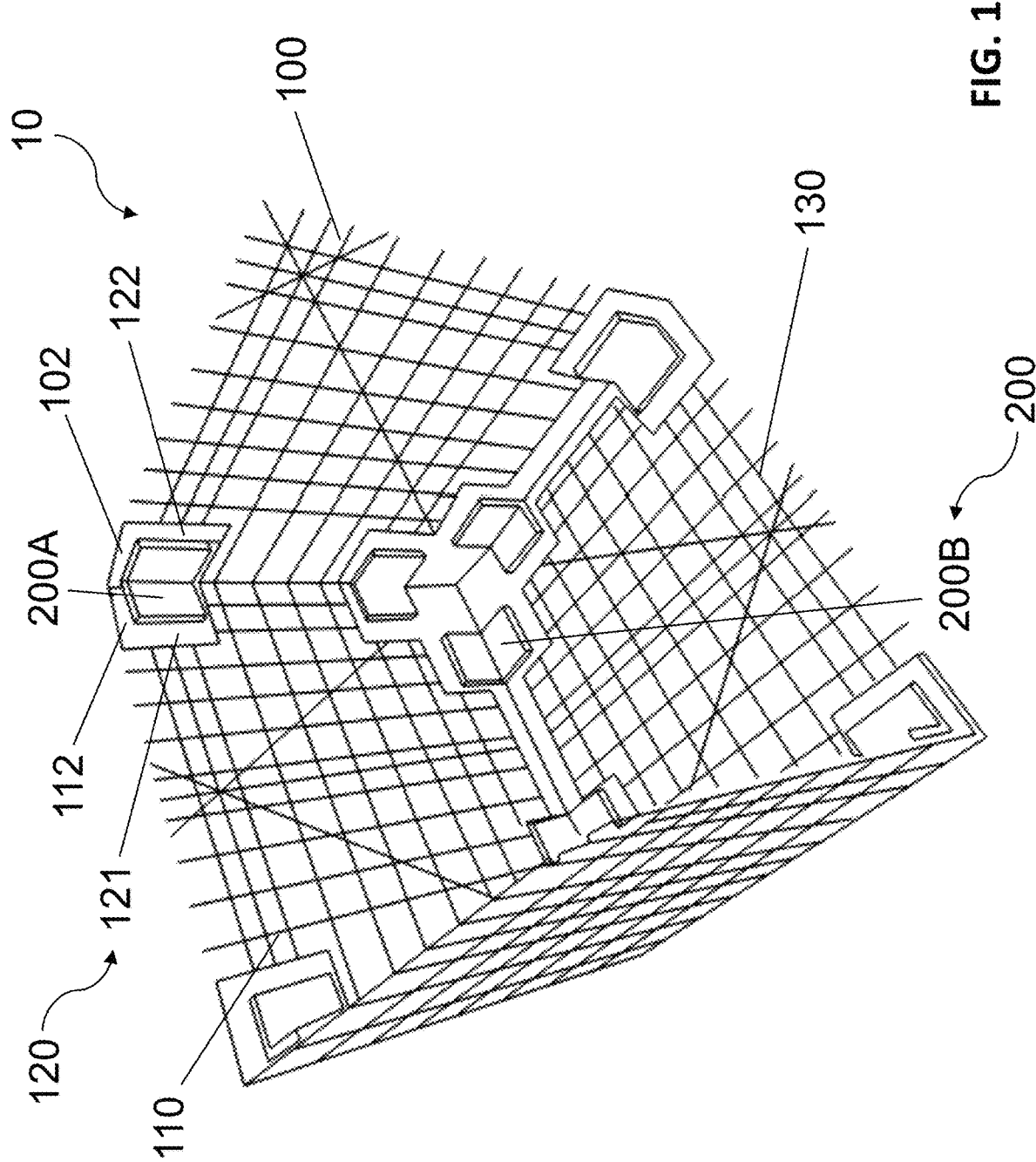
FIG. 1 is a perspective view of a diverse decoration panel system according to an aspect of the embodiment.

FIG. 1 generally depicts a diverse decoration panel system 10 according to an aspect of the embodiments.

Referring to FIG. 1, in some embodiments, the diverse decoration panel system 10 may comprise at least one decoration panel 100, 110 and at least one panel connector 200 configured to couple with at least two decoration panels 100, 110. In other words, the panel connector 200 may be configured to couple one of the decoration panels 100 with the other one of the decoration panels 110.

Figure 2:
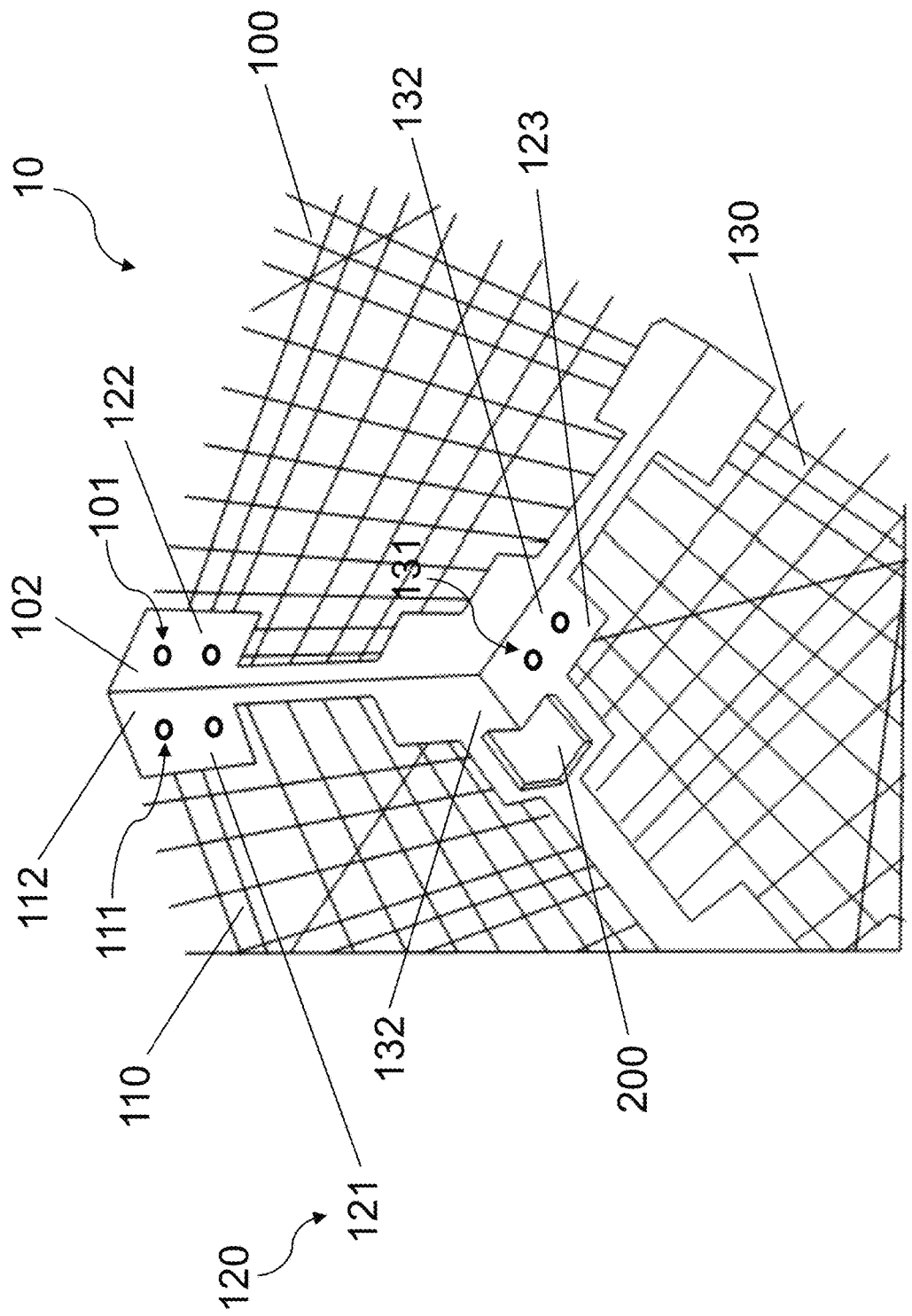
FIG. 2 is a sectional view of the diverse decoration panel system according to an aspect of the embodiments.

FIG. 2 generally depicts the decoration panels 100, 110 of the diverse decoration panel system 10 according to an aspect of the embodiments.

Referring to FIG. 2, each of the decoration panels 100, 110 comprises at least one connection through holes 101, 111 configured to engage with the panel connector 200 to securely connect at least two of the decoration panels 100, 110.

In some embodiments, the decoration panel may comprise a first decoration panel 110 and a second decoration panel 100 arranged adjacent to the first decoration panel 110. In still some embodiments, the first decoration panel 110 may be angledly arranged with respect to the second decoration panel 100.

In still some embodiments, the decoration panel may comprise the first decoration panel 110 having at least one first connection through hole 111 and the second decoration panel 100 having at least one second connection through hole 101, wherein the first connection through hole 111 and the second connection through hole 101 may be located at the same level. For example, the first connection through hole 111 may be aligned with the second connection through hole 101.

It should be noted that, in some embodiments, the first decoration panel 110 may have a first peripherical edge 112 and the second decoration panel 100 may have a second peripherical edge 102, wherein the first peripherical edge 112 may be aligned with the second peripherical edge 102.

Continuing to FIG. 2, in still some embodiments, the first decoration panel 110 may have at least one first connection through hole 111 arranged along the first peripherical edge 112 of the first decoration panel 110 and at least one second connection through hole 101 arranged along the second peripherical edge 102 of the second decoration panel 100.

In some embodiments, the decoration panel may comprise at least one retaining portion 120 formed along the peripherical edge (the first peripheral edge 112 and/or the second peripheral edge 102), wherein the connection through hole (the first connection through hole 111 and/or the second connection through hole 101) may be formed on the retaining member 120.

In still some embodiments, the first decoration panel 110 may comprise at least one first retaining portion 121 formed along the first peripheral edge 112 and the second decoration panel 100 may comprise at least one second retaining portion 122 formed along the second peripheral edge 102, wherein the first connection through holes 111 may be formed on the first retaining portion 121 and the second connection through holes 101 may be formed on the second retaining portion 122.

In still some embodiments, the decoration panel may comprise a gridwall portion formed on locations except to locations of the retaining portions, wherein the gridwall portion may be configured as a grid configuration and allow predetermined decoration elements to be attached thereon.

As shown in further detail in FIGS. 1-2, in some embodiments, the decoration panel may comprise the first decoration panel 110, the second decoration panel 100 angledly arranged with the first decoration panel 110, and a third decoration panel 130 angledly arranged with the first decoration panel 110 and/or the second decoration panel 100, wherein at least one of the panel connectors 200A may be configured to couple the first decoration panel 110 with the second decoration panel 100, and at least one of the other one of the panel connectors 200B may be configured to couple the third decoration panel 130 with the first decoration panel 110 and the second decoration panel 100.

It should be noted that, in some embodiments, the third decoration panel 130 may comprise at least one third retaining portions 123 formed along at least one third peripheral edge 132 formed on the third decoration panel 130, wherein the third decoration panel 130 may comprise at least one third connection through holes 131 formed on the third retaining portions 123, and in such a way, one of the third peripheral edges 132 may be aligned with the first peripheral edges 112 and the other one of the third peripheral edges 132 may be aligned with the second peripheral edges 102.

Figure 3A:
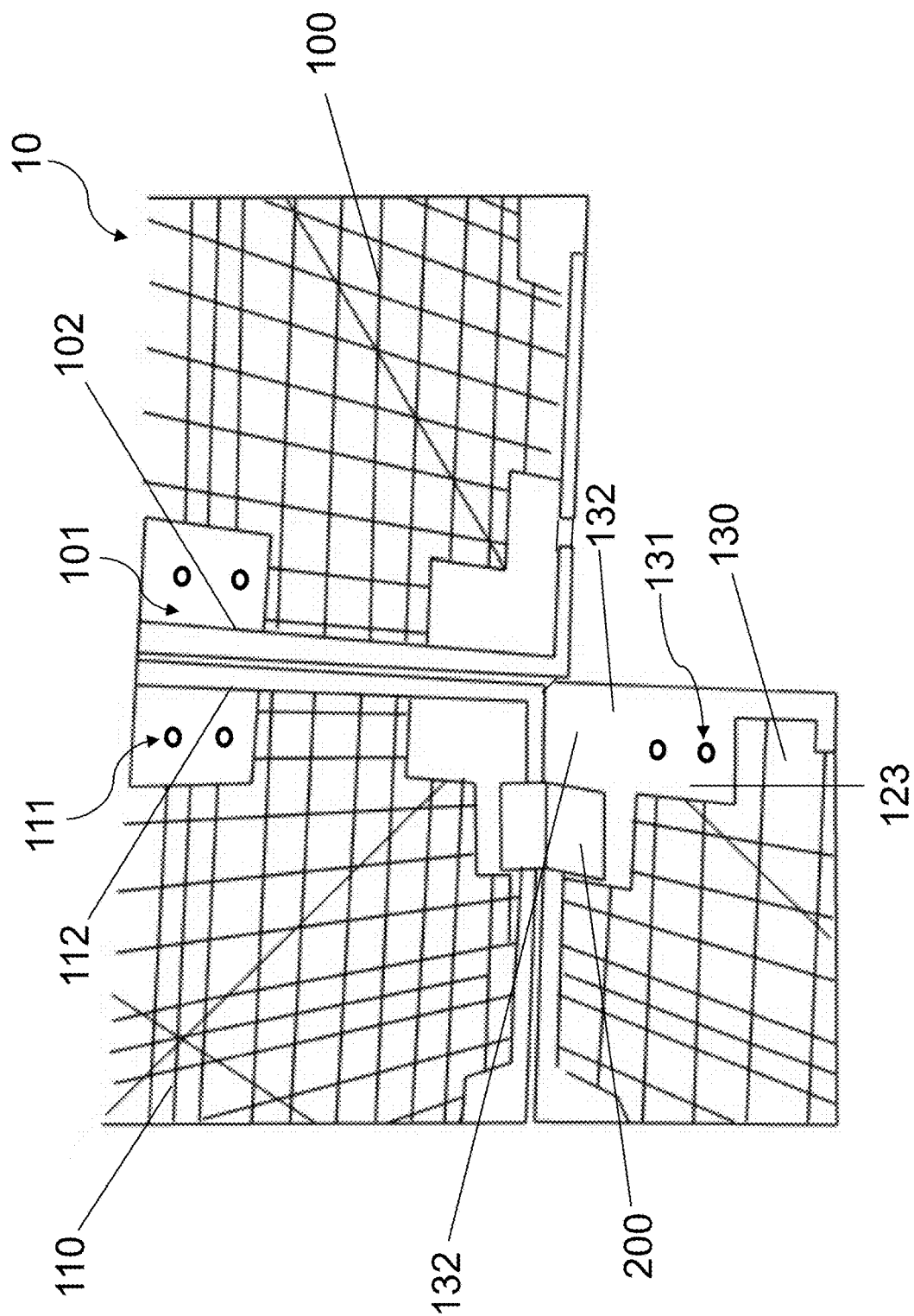
FIG. 3A is another sectional view of the diverse decoration panel system according to an aspect of the embodiments.
Figure 3B:
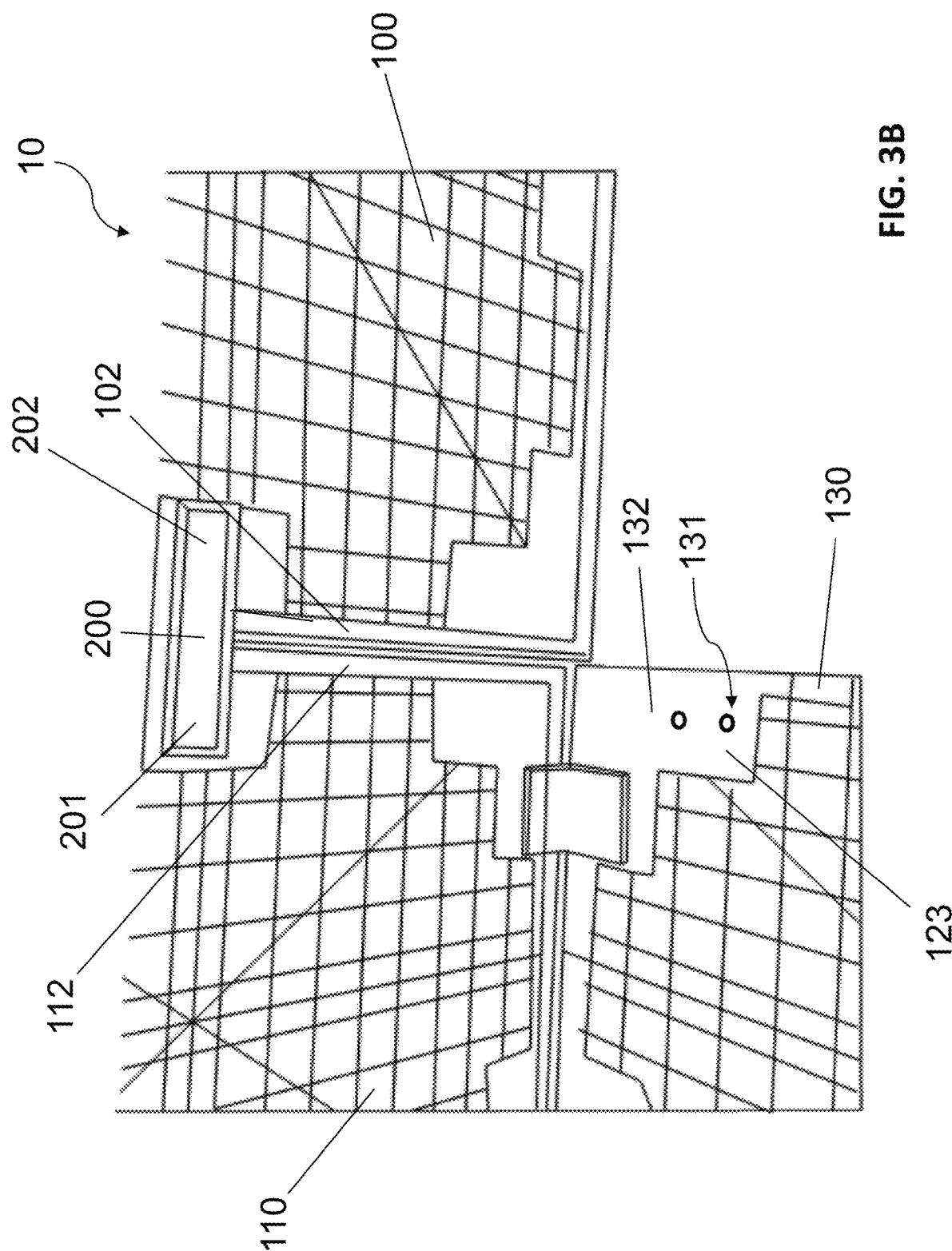
FIG. 3B is another sectional view of the diverse decoration panel system, showing the panel connectors cooperated with the decoration panels according to an aspect of the embodiments.

FIGS. 3A to 3B generally depict the diverse decoration panel system 10 according to an aspect of the embodiments.

Referring to FIGS. 3A to 3B, the decoration panel may comprise the first decoration panel 110 and the second decoration panel 100 parallelly arranged with the first decoration panel 100.

In some embodiments, the decoration panel may comprise the first decoration panel 110, the second decoration panel 100 parallelly arranged with the first decoration panel 110, and the third decoration panel 130 angledly arranged with the first decoration panel 110 or the second decoration panel 100.

In some embodiments, the first decoration panel 110 may have at least one first connection through hole 111 and the second decoration panel 100 may have at least one second connection through hole 101, wherein the first connection through hole 111 and the second connection through hole 101 may be located at the same level, and in such a way, the third decoration panel 130 may comprise at least one third connection through hole 131.

For example, at least one of the first connection through hole 111 may be aligned with at least one of the second connection through holes 101, and in the same situation, at least the other one of the first connection through holes 111 may be aligned with the third connection through holes 131, and in such a way, at least one of the panel connectors 200 may be configured to couple the first decoration panel 110 with the second decoration panel 100, and at the same time, at least the other one of the panel connectors 200 may be configured to couple the third decoration panel 130 with the first decoration panel 110 and/or the second decoration panel 100.

In some embodiments, continuing to FIG. 3B, the panel connector 200 comprises a first connection portion 201 and a second connection portion 202 parallelly arranged the first connection portion 201, wherein the first connection portion 201 may be connected with one of the decoration panels (the first decoration panel 110) and the second connection portion 202 may be connected with the other one of the decoration panels (the second decoration panel 100).

Figure 4A:
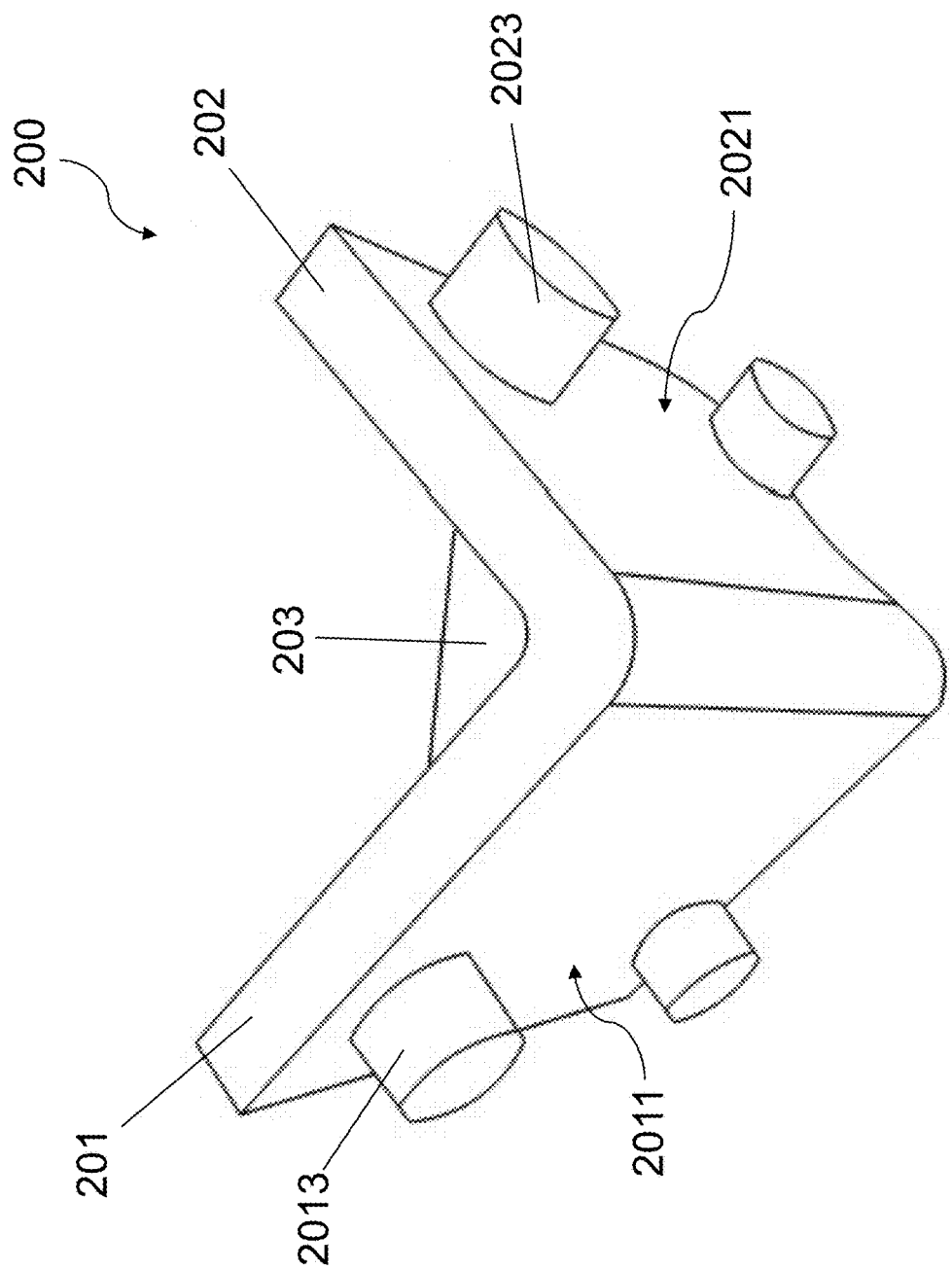
FIG. 4A is a perspective view of the panel connector according to an aspect of the embodiments.
Figure 4B:
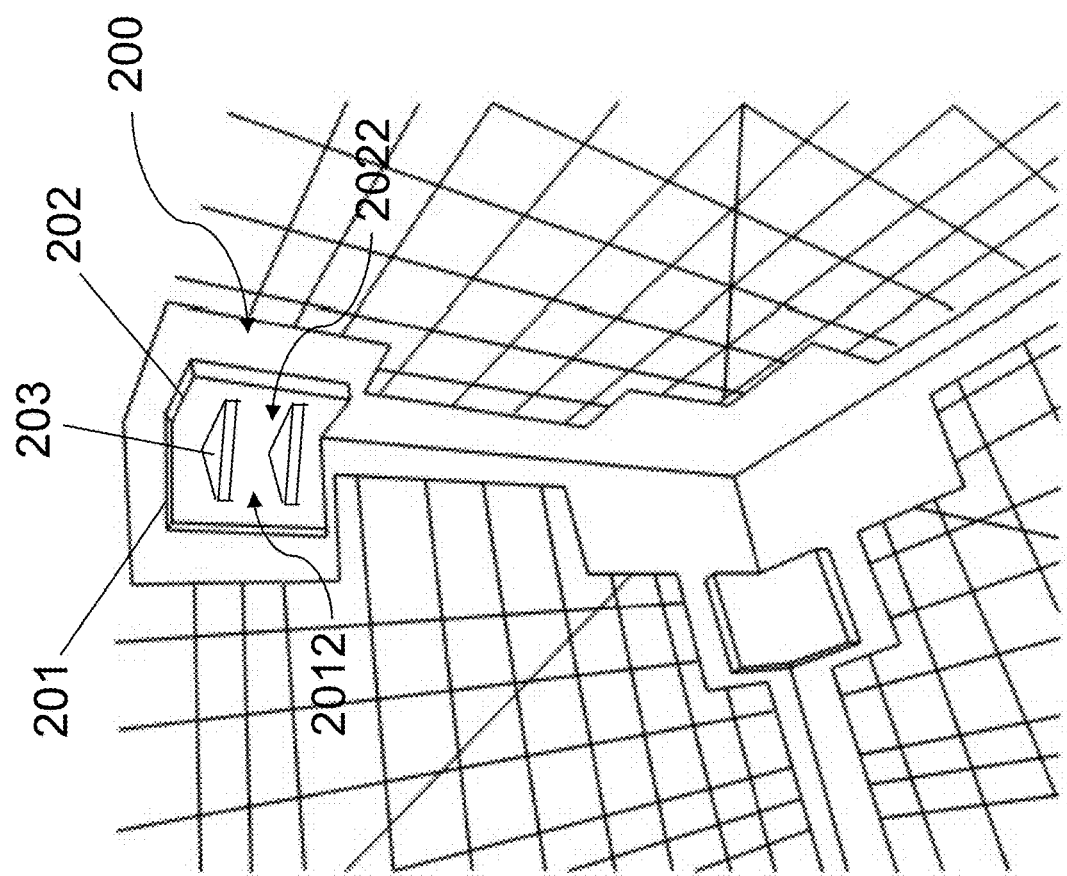
FIG. 4B is a sectional view of the panel connector of FIG. 4A being cooperated with the decoration panel according to an aspect of the embodiments.

FIGS. 4A to 4B generally depict the panel connector 200 according to an aspect of the embodiments.

Referring to FIGS. 4A to 4B, the panel connector 200 may comprise the first connection portion 201 and the second connection portion 202 integrally extended from the first connection portion 201, wherein the first connection portion 201 may be angledly arranged with the second connection portion 202, wherein the first connection portion 201 may be connected with one of the decoration panels (the first decoration panel) 110 and the second connection portion 202 may be connected with the other one of the decoration panels (the second decoration panel) 100.

Referring to FIG. 4A to FIG. 4B, the panel connector may comprise the first connection portion 201 having a first front surface 2011 and a first rear surface 2012 opposite of the first front surface 2011 and the second connection portion 202 having a second front surface 2021 and a second rear surface 2022 opposite of the second front surface 2021, wherein the first connection portion 201 may comprise at least one first protrusion 2013 integrally extended from the first front surface 2011, and in such a way, the second connection portion 202 may comprise at least one second protrusion 2023 integrally extended from the second front surface 2021.

Continuing to FIG. 4A to FIG. 4B, the panel connector comprises the first connection portion 201, the second connection portion 202, and the third supporting portion 203 integrally extended between the first connection portion 201 and the second connection portion 202.

In still some embodiments, the third supporting portion 203 may be integrally extended between the first rear surface 2012 of the first connection portion 201 and the second rear surface 2022 of the second connection portion 202 to remain the first connection portion 201 being angledly arranged with the second connection portion 202.

Figure 5A:
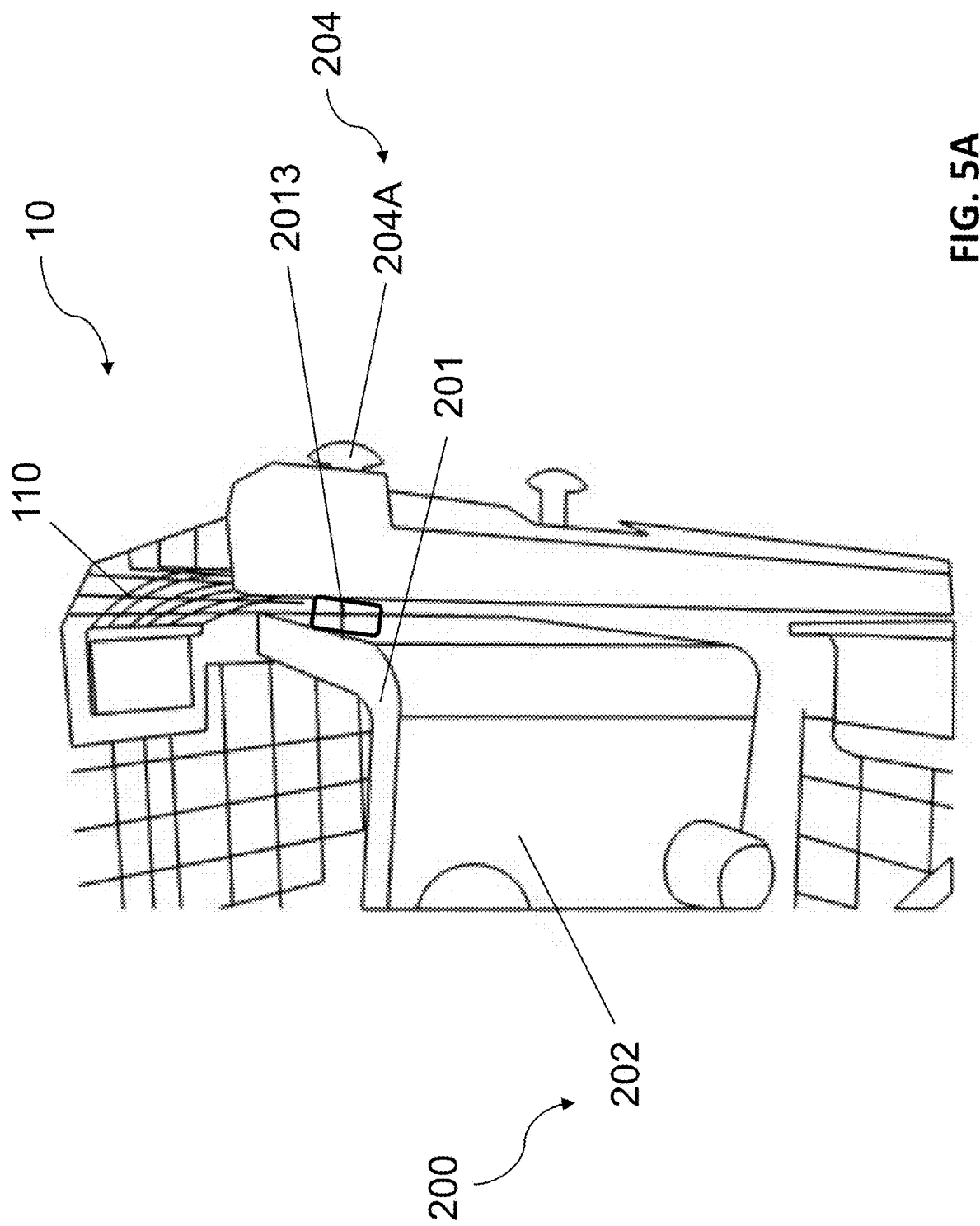
FIG. 5A and FIG. 5B are exploded views showing the panel connector cooperated with the decoration panel according to an aspect of the embodiments.
Figure 5B:
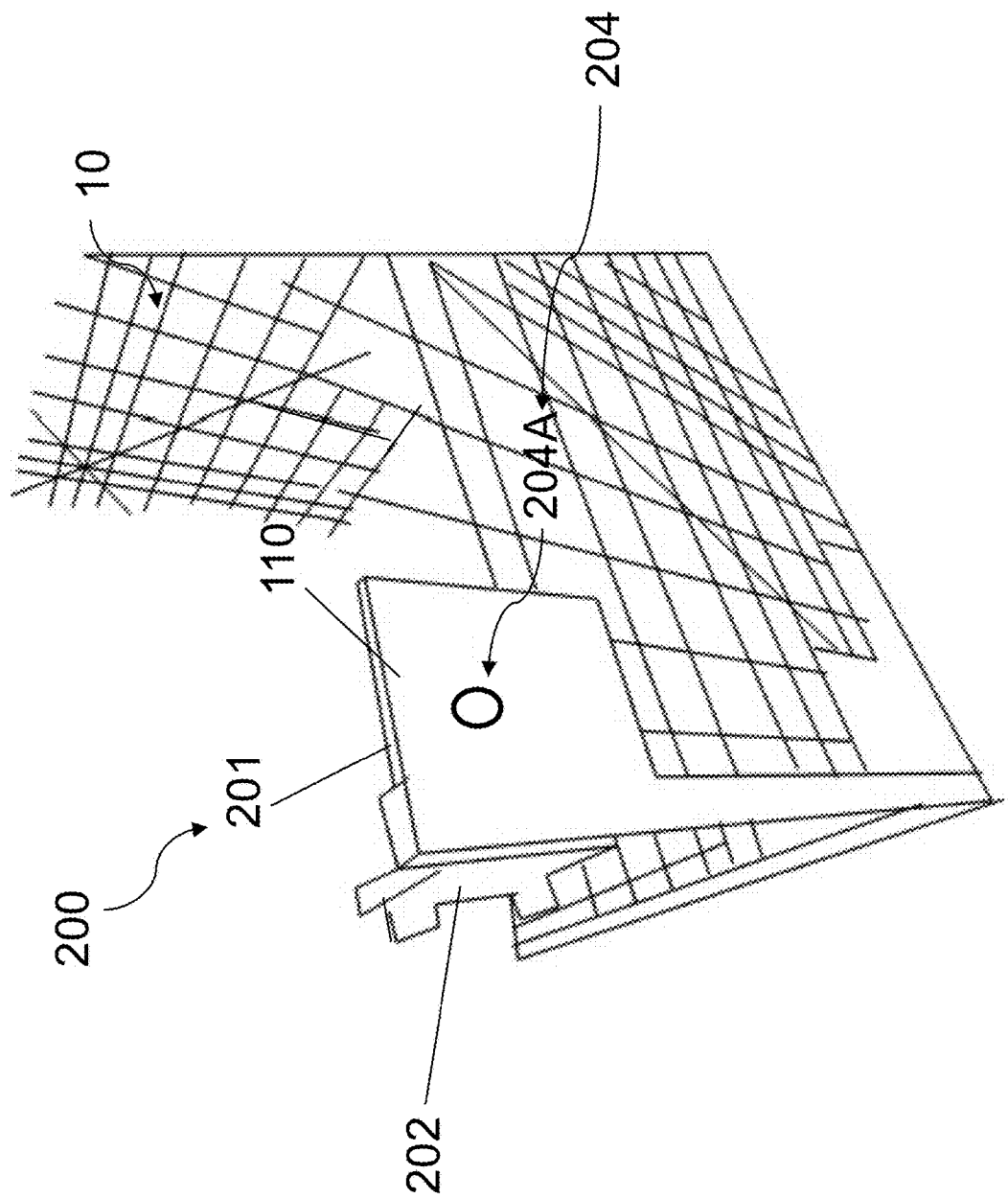

FIG. 5A and FIG. 5B generally depict the decoration panel cooperated with the panel connector according to an aspect of the embodiments.

Referring to FIGS. 5A to 5B, the panel connector may comprise the first connection portion 201 having the first protrusions 2013 engaged with at least one first connection through hole 111 (see FIG. 2) formed on the first decoration panel 110.

It should be noted that, in some embodiments, the panel connector 200 may comprise a fastener 204 configured to pass through the decoration panel (the first decoration panel 110, the second decoration panel 100, and/or the third decoration panel 130) and the panel connector 200 to secure the decoration panel (the first decoration panel 110, the second decoration panel 100, and/or the third decoration panel 130) being coupled with the panel connector 200.

In still some embodiments, the first connection portion 201 may comprise at least one first protrusion 2013 integrally extended from the first front surface and configured to engage with at least one first connection through hole 111 (see FIG. 2) formed on the first decoration panel 110, and in such a way, the panel connector 200 may comprise a first fastener 204A passed through the first decoration panel 110 and the first connection portion 201 of the panel connector 200 to secure the first decoration panel 110 with the first connection portion 201 of the panel connector 200.

Figure 5C:
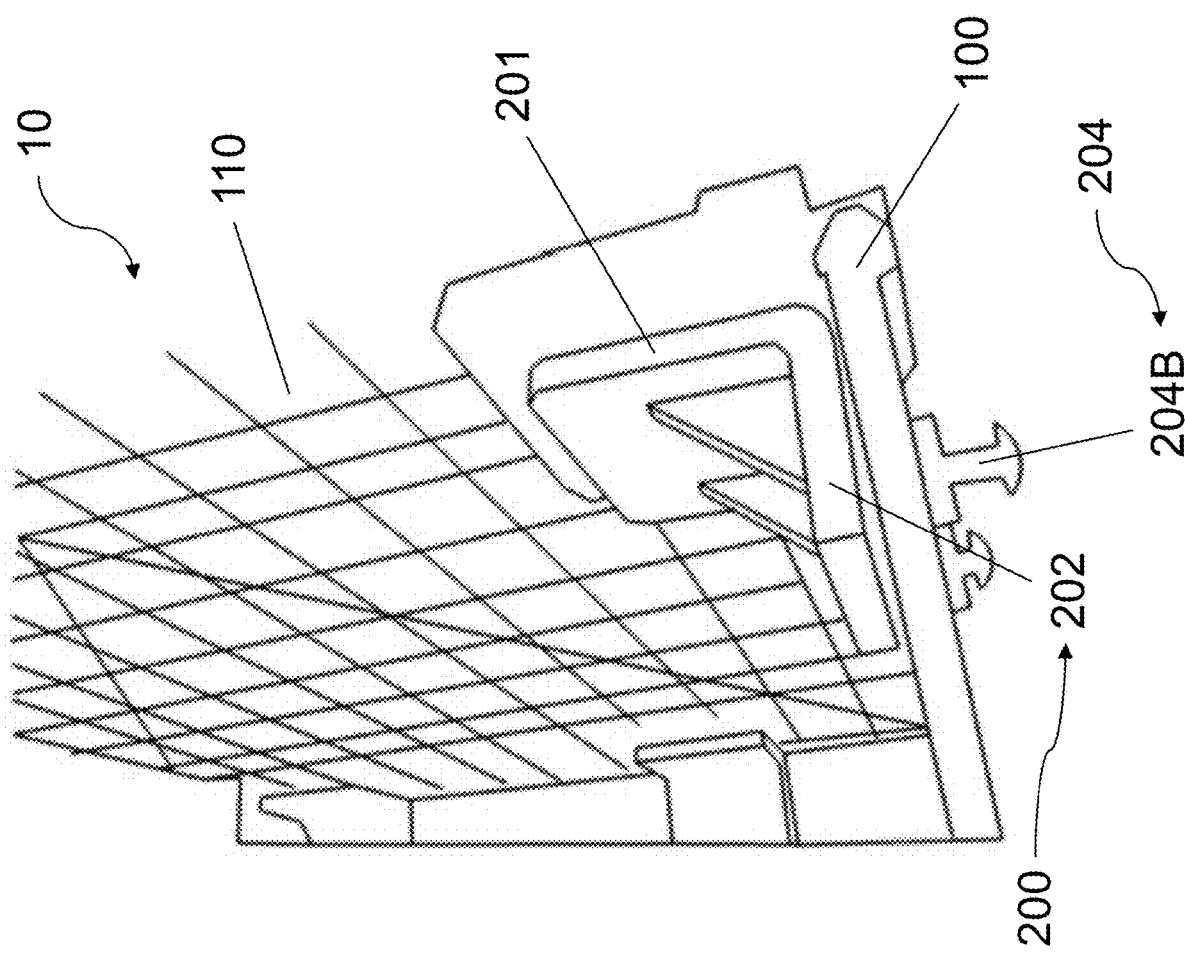
FIG. 5C is a sectional view of the panel connector being coupled with a first decoration panel and a second decoration panel according to an aspect of the embodiments.

FIG. 5C generally depicts the decoration panel cooperated with the panel connector according to an aspect of the embodiments.

Referring to FIG. 5C, the second connection portion 202 may comprise at least one second protrusion 2023 integrally extended from the second front surface and configured to engage with at least one second connection through hole 101 formed on the second decoration panel 100 (see FIG. 2).

In some embodiments, the panel connector may comprise a second fastener 204B passed through the second decoration panel 100 and the second connection portion 202 of the panel connector 200 to secure the second decoration panel 100 with the panel connector 200 (see FIG. 4A).

It should be noted that, in some embodiments, also see FIG. 2 and FIG. 4A, the first connection portion 201 may comprise at least one first protrusion 2013 integrally extended from the first front surface 2011 and configured to engage with at least one first connection through hole 111 formed on the first decoration panel 110, and in such a way, the panel connector 200 may comprise a first fastener 204A (see FIG. 5A) passed through the first decoration panel 110 and the first connection portion 201 of the panel connector 200 to secure the first decoration panel 100 with the panel connector 200, and at the same time, the second connection portion 202 may comprise at least one second protrusion 2023 integrally extended from the second front surface 2021 and configured to engage with at least one second connection through hole 101 formed on the second decoration panel 100, and in such a way, the panel connector 200 may comprise a second fastener 204B passed through the second decoration panel 100 and the second connection portion 202 of the panel connector 200 to secure the second decoration panel 100 with the panel connector 200; therefore, according to the above mentioned configuration, the panel connector 200 may be configured to connect the first decoration panel 110 with the second decoration panel 100 without other assemblies.

Many alterations and modifications may be made by those having ordinary skill in the art without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

Thus, specific embodiments and applications of the diverse decoration panel system have been disclosed. It should be apparent, however, to those skilled in the art that many more modifications besides those already described are possible without departing from the disclosed concepts herein. The disclosed embodiments, therefore, are not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

The words used in this specification to describe the various embodiments are to be understood not only in the sense of their commonly defined meanings but to include by special definition in this specification structure, material or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

What is claimed is:

1. A diverse decoration panel system, comprising:
    at least one decoration panel comprising a first decoration panel and a second decoration panel;
    at least one panel connector configured to couple the first decoration panel with the second decoration panel; wherein
    each of the decoration panels comprises at least one connection through hole configured to engage with the panel connector to securely connect one of the decoration panels with another one of the decoration panels; wherein
    the panel connector comprises a first connection portion, a second connection portion, and a third supporting portion integrally extended and angledly arranged between the first connection portion and a second connection portion; wherein
    the first connection portion has a first front surface, a first rear surface opposite of the first front surface, at least one first protrusion integrally extended from the first front surface and configured to engage with at least one first connection through hole formed on the first decoration panel, and a first fastener passed through the first protrusion and the first connection through hole to secure the first decoration panel with the first connection portion of the panel connector.

2. The diverse decoration panel system of claim 1, wherein the second decoration panel is angledly arranged with the first decoration panel.

3. The diverse decoration panel system of claim 1, wherein the first decoration and the second decoration panel are coplanar.

4. The diverse decoration panel system of claim 1, wherein the second decoration panel has at least one second connection through hole, wherein the first connection through hole is aligned with the second connection through hole.

5. The diverse decoration panel system of claim 1, wherein the second connection portion is integrally extended from the first connection portion, wherein the first connection portion is connected with the first decoration panel and the second connection portion is connected with the second decoration panel.

6. The diverse decoration panel system of claim 1, wherein the second connection portion is angledly arranged with the first connection portion, wherein the first connection portion is connected with the first decoration panel and the second connection portion is connected with the second decoration panel.

7. The diverse decoration panel system of claim 1, wherein the second connection portion has a second front surface and a second rear surface opposite of the second front surface.

8. The diverse decoration panel system of claim 1, wherein the second connection portion has a second front surface, a second rear surface, and at least one second protrusion integrally extended from the second front surface and configured to engage with at least one second connection through hole formed on the second decoration panel.

9. The diverse decoration panel system of claim 1, wherein the second connection portion has a second front surface and a second rear surface, and the third supporting portion is integrally extended between the first rear surface and the second rear surface to maintain the first connection portion angledly arranged with the second connection portion.

10. The diverse decoration panel system of claim 1, wherein the decoration panel comprises a second fastener passed through the second decoration panel and the panel connector to secure the second decoration panel with the panel connector.

11. The diverse decoration panel system of claim 1, wherein the at least one first connection through hole is arranged along a first peripherical edge of the first decoration panel and the second decoration panel has at least one second connection through hole arranged along a second peripherical edge of the second decoration panel.

12. The diverse decoration panel system of claim 1, wherein the first decoration panel has a first peripherical edge and the second decoration panel has a second peripherical edge, wherein the first peripherical edge is aligned to the second peripherical edge.

13. The diverse decoration panel system of claim 1, wherein the decoration panel comprises a peripherical edge and at least one retaining portion formed along the peripherical edge, wherein the connection through hole is formed on the retaining portion.

14. The diverse decoration panel system of claim 1, wherein the decoration panel comprises a third decoration panel angledly arranged with the first decoration panel or the second decoration panel, and the first decoration panel and the second decoration panel are coplanar.

15. The diverse decoration panel system of claim 1, wherein the decoration panel comprises a first decoration panel, a second decoration panel angledly arranged with the first decoration panel, and a third decoration panel angledly arranged with the first decoration panel and/or the second decoration panel.

\* \* \* \* \*